Patented June 20, 1944

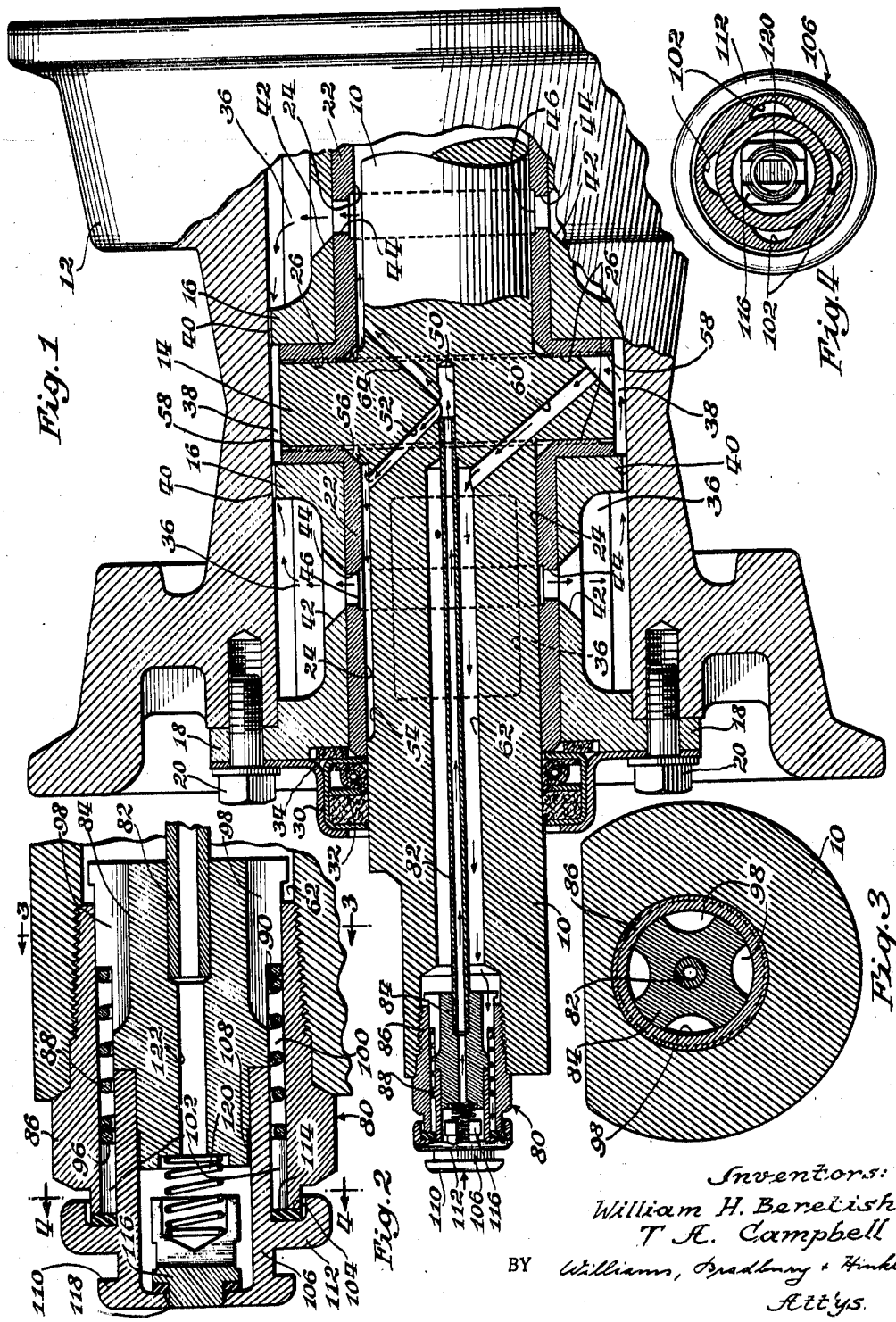

2,351,909

UNITED STATES PATENT OFFICE 2,351,909

LUBRICATING APPARATUS

William H. Beretish and Thomas Arthur Campbell, Chicago, Ill., assignors to Stewart-Warner Corporation, Chicago, Ill., a corporation of Virginia Application October 10, 1941, Serial No. 414,424

4 Claims. (Cl. 308—109)

Our invention relates generally to lubricating apparatus, and more particularly to fittings and apparatus for the pressure lubrication of sealed bearings.

It is an object of our invention to provide an improved lubricating apparatus for the pressure lubrication of sealed bearings, such as, for example, the track roller bearings of endless track tanks and tractors.

A further object of our invention is to provide an improved lubricant receiving fitting having incorporated therein a safety valve for venting the bearing to prevent the development of excessive pressures therein.

A further object of our invention is to provide an improved lubricant receiving fitting having a portion adapted to be engaged by a coupler and in which said portion is rotatable with respect to the remainder of the fitting to prevent accidental unscrewing of the fitting from the bearing.

A further object is to provide an improved lubricant receiving fitting having means to limit the rate at which lubricant may be supplied to a bearing.

A further object is to provide an improved lubricant receiving fitting and apparatus for the lubrication of sealed bearings, which is simple in construction, may be easily used, and which may be economically manufactured.

Other objects will appear from the following description, reference being had to the accompanying drawing, in which:

Fig. 1 is a fragmentary central vertical sectional view of a track roller bearing and spindle assembly incorporating the improved lubricating apparatus of the invention;

Fig. 2 is a longitudinal sectional view of the lubricant receiving fitting drawn to an enlarged scale; and, Figs. 3 and 4 are transverse sectional views taken on the lines 3—3 and 4—4 of Fig. 2, said figures being at a slightly reduced scale with respect to that of Fig. 2.

Considerable difficulty has been experienced in the adequate lubrication of the bearings of track rollers as used on vehicles propelled by endless tracks, such as tanks and tractors. These bearings are provided with oil seals to prevent the admission of water and other foreign matter into the bearing. Due to the provision of these oil seals, it is difficult, by ordinary methods of lubrication, to force grease into the bearing without damaging the oil seal. Furthermore, such bearings are subjected to severe usage, so that it is of great importance that the old lubricant in the bearing in which the lubricating qualities have deteriorated, be forced from the bearing and replaced with fresh lubricant.

In the construction disclosed herein, the bearings are so arranged that the oil flows through them in more or less predetermined paths so that when fresh lubricant is forced under pressure into one portion of the bearing, it flows through the bearing along such predetermined paths, ejecting the used lubricant from the bearing structure.

More particularly, as shown in Figure 1, the bearing structure comprises a spindle or axle 10 upon which a track roller 12 is mounted for free rotation. The spindle 10 has a central enlarged diameter portion 14 serving as part of a thrust bearing to maintain the track roller 12 in proper position longitudinally on the spindle 10. The track roller carries a pair of bearing liners 16 having flanges 18 secured to the track roller 12 by cap screws 20. Flanged bearing bushings 22 are fitted within the liners 16, being preferably made of bronze or other suitable bearing material and forming cylindrical bearing surfaces 24 and thrust bearing surfaces 26. The cap screws 20 also hold in place a retaining collar 30 for a suitable oil seal assembly 32. This oil seal assembly may be of any suitable construction which is effective to form a water- and lubricant-tight seal around the spindle 10. An annular gasket 34 forms a seal against which the housing of the oil seal assembly 32 is pressed.

The bearing liners 16 are provided with a plurality of separated pockets 36 for retaining lubricant, these pockets being in communication with an annular space 38 surrounding the enlarged portion 14 of the spindle through relatively small clearance passageways 40. The pockets 36 are provided with countersunk ports 42 which are in alignment with ports 44 formed in the bearing bushings 22. The bearing bushings preferably have an annular groove 46 connecting the ports 44. The lubricant is supplied to a central drilled passageway 50 and flows therefrom through a duct 52 to a longitudinal groove 54 formed in the external surface of the cylindrical portion of the spindle 10. From the groove 54, the lubricant may flow to the pockets 36 through annular groove 46 and ports 44 and 42, or may flow through an annular passageway 56 to the thrust bearing surface 26. The surface of the latter may be relieved by a lubricant distributing groove 58 which communicates with the space 38. Lubricant from the space 38 may flow through a passageway 60 to a central bore 62 formed in the spindle 10.

A passageway 64 leads from the passageway 50 to the other bearing portion of the spindle 10, which may be constructed in a manner similar to that previously described and through which the lubricant will flow in the same general manner as indicated by the arrows.

From the foregoing, it will be seen that lubricant supplied to the central passageway 50 may flow to the cylindrical and thrust bearing surfaces to the annular space 58 and from thence through the passageway 60 to the bore 62. In order to provide for such lubricant flow, a lubricant receiving fitting, designated generally by the reference character 80, is threaded in the outer end of the spindle 10 and has a relatively long and restricted lubricant feed tube 82 which has a sliding fit in the drilled passageway 50. The diameter of the passageway through the tube 82 is so small that even if lubricant is supplied under relatively high pressure, the flow will be restricted sufficiently that excessive pressures will not be built up within the bearing structure.

The tube 82 is secured in a core 84 which is mounted for sliding movement in the fitting body 86, being normally held in the position shown in the drawing by a compression coil spring 88, the ends of which abut against shoulders 90 formed on the core 84 and shoulders 96 extending inwardly from the body 86. The core 84 is provided with a plurality of grooves 98 for the flow of lubricant from the bore 62 to the space 100 between the core 84 and the body 86. Similarly, the body 86 is provided with a plurality of grooves 102 to permit flow of lubricant from the space 100 toward the outer end of the body 86, the extremity of which forms a valve seat 104.

A fitting shank 106 is secured to the core 84, as by a press fit over a knurled end portion 108 of the core 84, this shank having a button head 110 for engagement with the coupler of a pressure lubricating system, which may be of any suitable construction, preferably having a coupler of the general type disclosed in the patent to Ernest W. Davis, No. 1,541,329. The shank 106 is provided with a valve forming flange 112 having an annular gasket 114 for engagement with the valve seating surface 104 at the extremity of the body 86.

Within the shank 106 is a check valve 116 held in position to close an opening 118 formed in the button head 110 by a compression spring 120. The check valve 116 is provided with suitable cross passageways, as indicated in Fig. 4, to permit free flow of lubricant toward the center of the spring 120 when the latter is in fully compressed position so that the lubricant may flow through a central passageway 122 formed in the core 84, and hence through the bore of the tube 82.

From the foregoing, it will appear that when a suitable source of lubricant under pressure is connected to the button head 10 by a suitable detachable coupler, the lubricant pressure will force open the check valve 116 and flow through the passageway 122 in the core 84, through the bore in the tube 82 to the passageway 50 in the spindle 10. From this passageway, the lubricant will flow in the directions indicated by the arrows, driving ahead of it the old lubricant in the bearing through the passageway 60 and bore 62 to the lubricant receiving fitting 80. The old lubricant will then flow through the passageways 98 in the core 84, through the space 100 and through the ports 102. As soon as pressure within the bearing is built up, it will be exerted upon the effective area of the core 84 and gasket 114 to move the core 84 to the left, thus moving the gasket 114 away from the seat 104 and permitting the discharge of the used lubricant between the valve portion 112 of the sleeve or shank 106 and the body 86 of the fitting. The resistance to leftward movement of the core 84 afforded by the spring 88 is sufficient to assure building up a very slight pressure within the bearing structure and is insufficient to permit building up a pressure high enough to cause leakage past the oil seal assembly 32 or to cause damage to the latter. The leftward movement of the core 84 thus in effect forms a safety valve vent for the bearing structure to prevent building up excessive pressures in the bearing and to provide a vent for the discharge from the bearing of the used lubricant.

The tube 82, as previously stated, is slidable in the passageway 50, preferably having a very slight clearance, such as .005", so that substantially the only resistance to leftward movement of the core 84 and tube 82 is that afforded by the compression of the spring 88, which may be accurately predetermined. Furthermore, the button head 110 and its sleeve shank 106, together with the connected core 84 and tube 82, are freely rotatable. Thus, if, when the coupler is rigidly clamped to the button head 110, and is swung counterclockwise in a direction which would tend to unscrew the fitting body 86 from the spindle 10, such unscrewing does not take place because of the freely swiveling action between the button head 110 and the body 86.

It will be noted that the aggregate cross-sectional areas of the passageways permitting discharge of the lubricant from the annular space 38 are each greater than the cross-sectional area of the passageways through which the fresh lubricant is supplied to the bearing. For this reason, the pressure within the bearing structure cannot be built up very much above atmospheric pressure since the flow from the bearing structure to the atmosphere through these discharge passageways and past the check valve 104, 112, 114, is relatively free.

While we have shown and described particular embodiments of our invention, it will be apparent to those skilled in the art that numerous modifications and variations may be made without departing from the underlying principles of the invention. We therefore desire, by the following claims, to include within the scope of our invention, all such variations and modifications by which substantially the results of our invention may be obtained by the use of substantially the same or equivalent means.

We claim:

1. In a lubricating apparatus for the lubrication of a sealed bearing structure, a lubricant inlet passageway in said bearing structure leading to the bearing surfaces and a lubricant discharge passageway leading therefrom, a lubricant receiving fitting having a relatively movable head and body cooperating to form a check valve, said head having a part conformed for detachable connection with a source of lubricant under pressure, an extensible conduit connection between said head and said lubricant inlet passageway, and means to conduct lubricant from said discharge passageway to the check valve forming parts of said head and fitting to cause relative movement of the latter to valve opening position upon the generation of a predetermined pressure in said lubricant discharge passageway.

2. In a lubricating apparatus for the lubrication of a sealed bearing structure, a lubricant inlet passageway in said bearing structure leading to the bearing surfaces and a lubricant discharge passageway leading therefrom, a lubricant receiving fitting having an apertured lubricant receiving head, conduit means connecting said head to said inlet passageway, said conduit being constructed to permit movement of said fitting head with respect to the bearing structure, a fitting body secured to the bearing structure, cooperable valve means on said fitting head and body, resilient means to hold said valve means closed, and means for conducting lubricant from said discharge passageway to said valve means for escape therethrough whenever the pressure of the lubricant in said discharge passageway exceeds a predetermined maximum value.

3. A lubricant receiving fitting for a part to be lubricated having a lubricant inlet passageway and a lubricant discharge passageway comprising a generally tubular body having means for securing it to a part to be supplied with lubricant at the end of a lubricant discharge passageway of the latter, a head for attachment to a source of lubricant pressure and having a lubricant receiving opening therein, resilient means to hold said head against the end of said body to form a check valve closure therefor, and conduit means connecting the lubricant receiving opening in said head with the lubricant inlet passageway in the part to be supplied with lubricant, said conduit means being extensible to permit movement of said head away from the end of said body, thereby to permit escape of lubricant from said discharge passageway when the lubricant pressure therein exceeds a predetermined value.

4. A lubricant receiving fitting comprising a generally tubular body constructed for attachment to a part to be supplied with lubricant, said body having a valve seat formed at its outer end, an apertured head having means for attachment to a source of lubricant under pressure and having a valve portion cooperable with said valve seat, a conduit secured to said head and communicating with the aperture therein, said conduit forming a lubricant inlet to the part to be supplied with lubricant, resilient means to hold said head in position with its valve portion in engagement with said valve seat, and discharge passageways in said head connecting said valve seat and the outlet of the part to be lubricated.

WILLIAM H. BERETISH.
THOMAS ARTHUR CAMPBELL.